United States Patent [19]

Canziani

[11] 4,399,904
[45] Aug. 23, 1983

[54] SORTING AND/OR CONVEYING SYSTEM AND RELEVANT WORKING PLANTS

[75] Inventor: Francesco Canziani, San Macario, Italy

[73] Assignee: C.M.L. Costruzioni Meccaniche Lonatesi, S.p.A., San Macario, Italy

[21] Appl. No.: 226,602

[22] Filed: Jan. 21, 1981

[30] Foreign Application Priority Data

Apr. 16, 1980 [IT] Italy ............................. 21397 A/80

[51] Int. Cl.³ ............................................. B63G 47/38
[52] U.S. Cl. .................................. 198/365; 104/140; 104/163; 198/854
[58] Field of Search ............................. 198/365, 854; 104/138 R, 139-146, 154-156, 163

[56] References Cited

U.S. PATENT DOCUMENTS 4,278,165 7/1981 Nielsen et al. ..................... 198/365

FOREIGN PATENT DOCUMENTS 617612 7/1978 U.S.S.R. ............................. 104/163

Primary Examiner—Robert C. Watson
Assistant Examiner—Douglas D. Watts
Attorney, Agent, or Firm—Anthony Pellicano

[57] ABSTRACT

A sorting and/or conveying system and relevant working plants wherein there are used a set of carriages preferably automatically tilting, dragged along a predetermined path, there being provided a preferably tubular guide with a longitudinal opening, on the inside of which there glide a certain number of spindles or the like, worked, through proper openings made along the guide, by one or more driving wheels linked to the power plant, to some of these spindles there being fastened the supports of the carriages.

4 Claims, 6 Drawing Figures

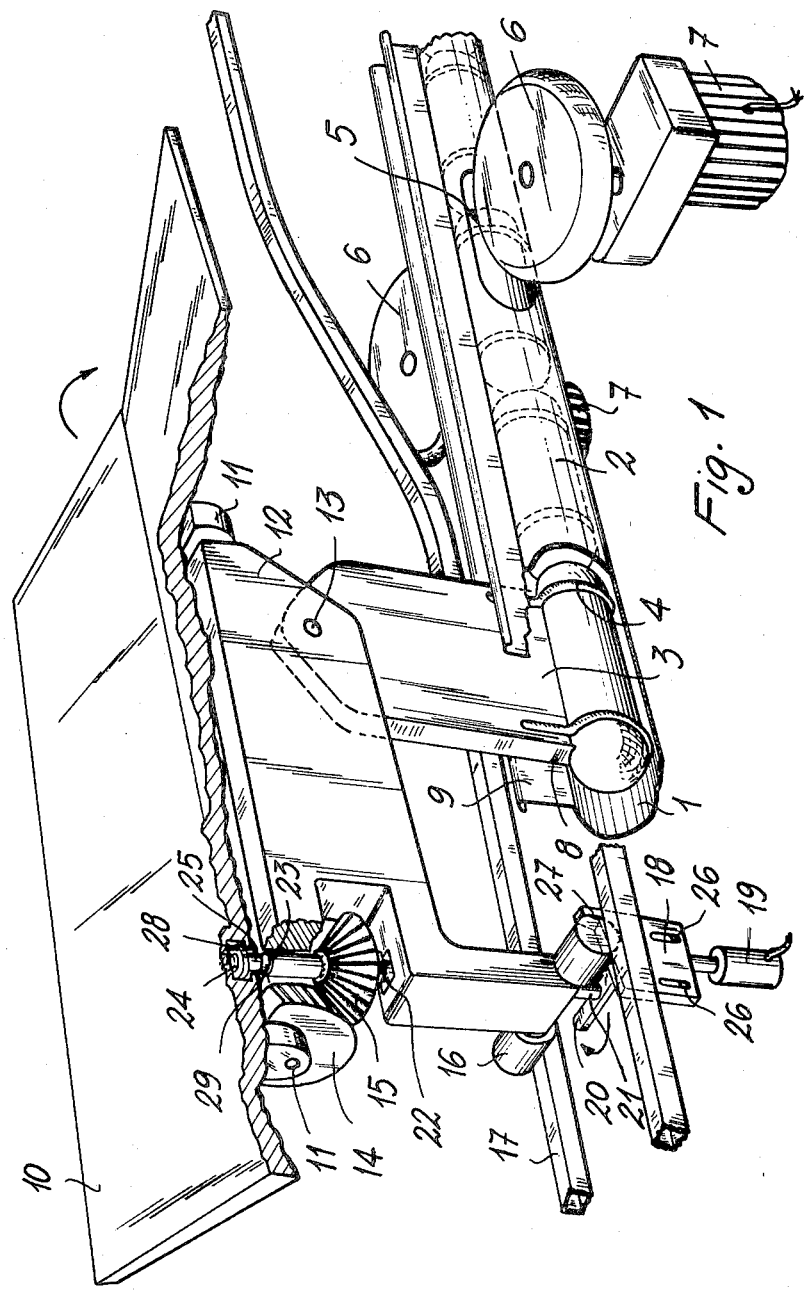

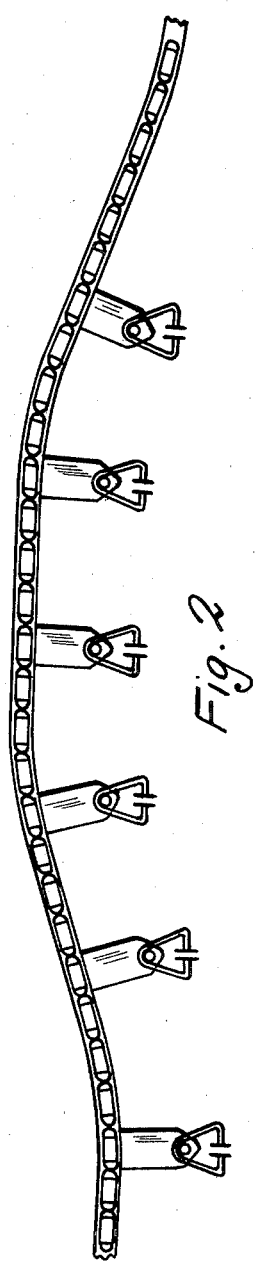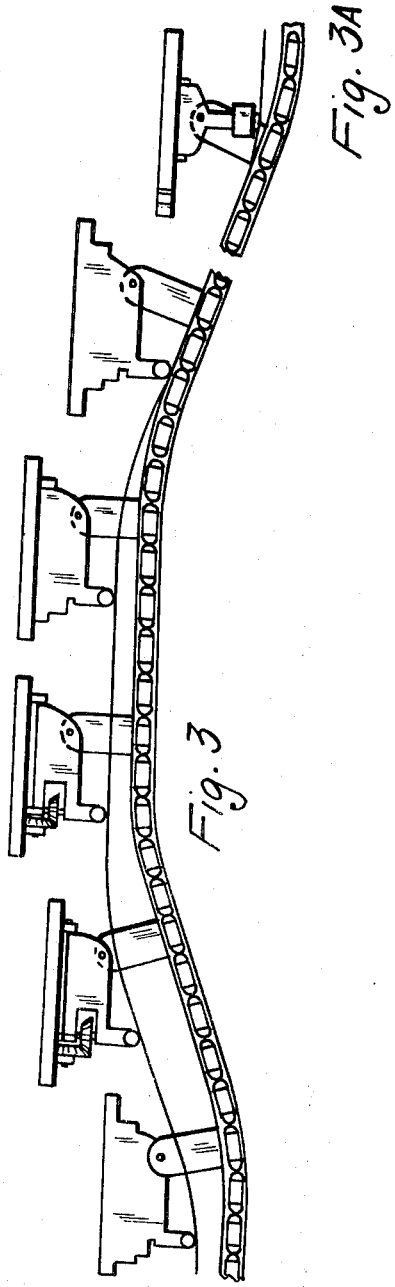

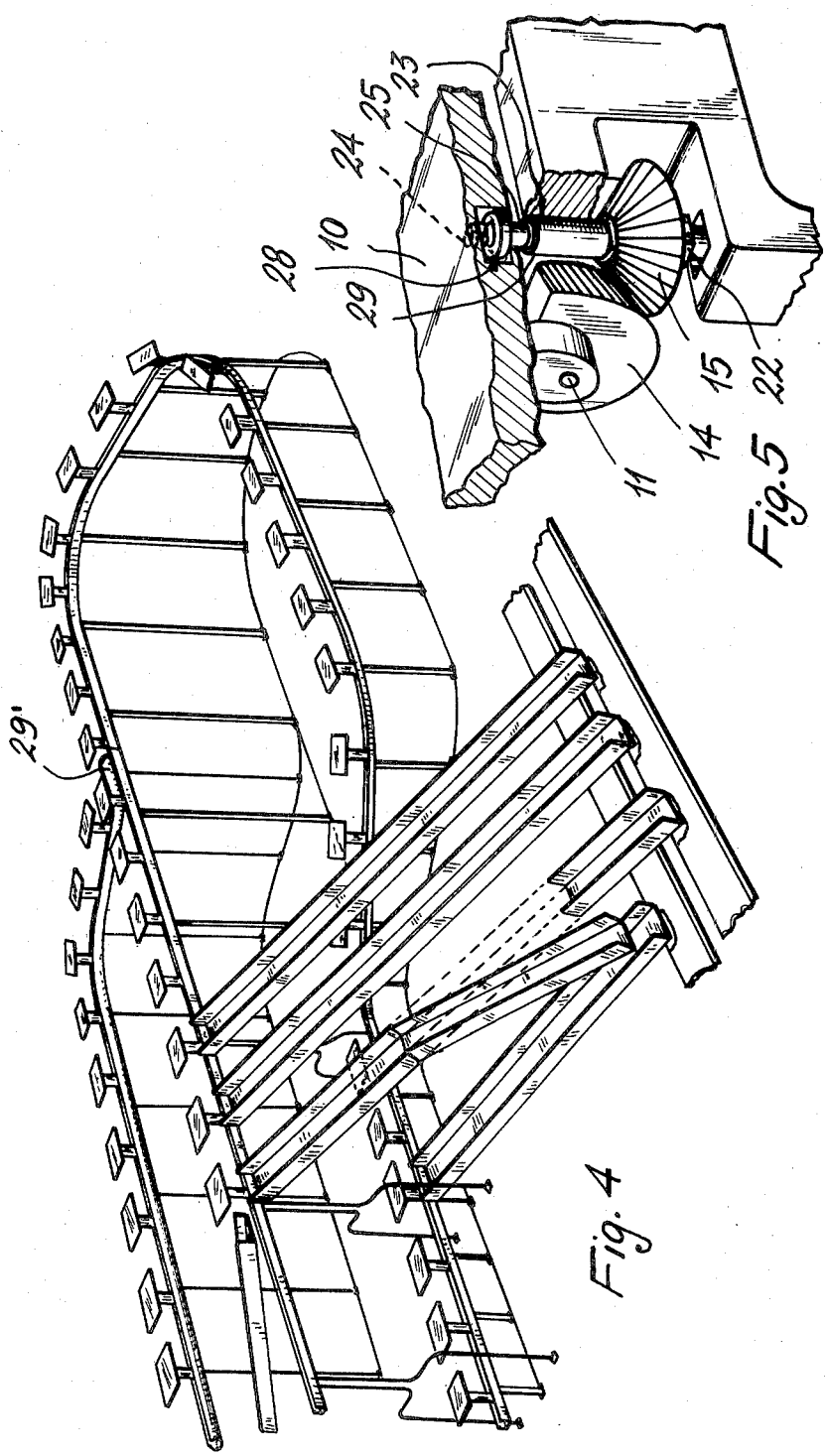

SORTING AND/OR CONVEYING SYSTEM AND RELEVANT WORKING PLANTS

The present invention relates to a sorting and/or conveying system with carriages, and relevant plants for the working thereof, having particular flexibility, silence and operational reliability characteristics.

The sorting out systems with carriages which are being used at present comprise generally a guide consisting of one or more rails on which carriages glide and are dragged by means of chains, belts or the like.

Such carriages, generally tilting, are loaded at one or more stations and then unloaded at fixed points along the path by means of tilting devices actioned by pre-set automatic systems.

The dragging takes place by means of chains or the like, usually operated by only one power plant. Considering that the length of said paths is generally of some hundreds meters, one cannot help realizing that these systems present some inconveniences.

If the power plant, which is a single unit, happens to break down, the whole plant must be stopped. What is worst, though, is the fact that in plants of this kind the guides cannot follow any path but they must be arranged on the same plane and, since it is not possible to provide for short-radius bends, it is difficult—if not impossible—to adapt said guides to the local requirements and to already existing loading or unloading stations, if any.

The present invention, which aims at avoiding such inconveniences, relates to a sorting and/or conveying system and relevant working plants, consisting essentially of a guide, preferably tubular and open, on the inside of which there glide a series of spindles (cylindrical bodies having two semi-spherical ends) or the like, touching one another, onto which carriages are fixed, said spindles being pushed onwards, through proper openings made in the guide, by a series of driving wheels, actioned by one or more power plants placed at pre-established intervals along the path. The advantages this system offers are clear: since the spindles are of reduced length, the guide which they slide in can follow any close circuit path, even on different planes or forming bends of very limited radius.

Furthermore, being the dragging units generally more then one and placed at intervals along the path, should one of them break down, this would not be detrimental to the working of the whole set, because the remaining units would make up for the above mentioned failure. The fact of using one or more working groups will then be depending on the load.

Another feature is that of providing one or more rails along the guide, having essentially the function of keeping the plates in mainly a horizontal position.

The present invention will be now described by mere way of non-limiting example, with particular reference to the accompanying drawings wherein:

FIG. 1 is a partially sectioned perspective view of the guide-dragging system and of the tilting system of the carriage.

FIG. 2 is a partially sectioned view of a stretch of guide-path wherein plates are not leaning on a carriage but are hanging.

FIG. 3 is a partially sectioned view of a stretch of guide-path for carriages wherein there is stressed the function of the rails accompanying the tubular guide.

FIG. 3A is a particular of an oscillating carriage with counterweight.

FIG. 4 is the view of a part of the plant wherein there can be seen a double path arranged on the same vertical plane.

FIG. 5 is a partially sectioned view of the tilting mechanism of the plates.

With reference to FIG. 1, a guide 1, preferably tubular, has all along its upper part a slot 8 limited by two walls 9, generally vertical.

On the inside of this guide there slide a series of spindles 2 or the like, provided with rings 4 of self-lubricating material (preferably polyamide), operated, through openings 5 made at pre-established points in guide 1, by driving wheels 6 actioned by power plants 7.

Onto some of these spindles there are fixed the supports 3 of plates 10.

At point 11, the plates are hinged to a support 12 which is in its turn hinged to supports 3 at point 13.

Hinges 11 and 13 are arranged so that the plate rotates around a mainly horizontal axis, parallel to the tubular guide, and support 12 likewise rotates around a mainly horizontal axis perpendicular to the first one.

At one end of support 12, there are two rollers 16 sliding on rails 17, said rails following alternatively the path of guide 1.

On the inside of these rails a pin 21, with a lever 20 fixed to its lower end, slides vertically into a hole 23 made in support 12.

This pin is cylindrical, with an upper segment preferably polygonal, and a seat of complementary shape.

Onto the upper part of said pin 21 there is keyed a bevel pinion 15 which, when the pin is pushed upwards, engages a conic toothed sector 14, fastened below plate 10 with the axis corresponding to the one linking hinges 11.

Finally, there is a toothed cam 18 which, by means of a lifting device 19 of known type, may be shifted upwards, sliding on guides 26, and get, at the proper moment, in the way of lever 20.

In a housing 28 of the plate there is a spring 24 which pushes downwards a pin 25, one end of which, extending below the plate, fits into hole 23 wherein pin 21 slides, blocking thus the plate in a mainly horizontal position. The working takes place in the following way:

The driving wheels 6, set in a rotary motion by power plants 7, exert a friction upon spindles 2 through openings 5, and set them in motion.

These spindles are so many that no empty space is left among them, that they move at the same time along the whole path and that every power plant bears the stress to the same extent.

Rails 17 slide above guide 1 at a distance which varies according to the inclination of said guide, so that the plate which leans on the rails upon support 12 and rollers 16, stays in a mainly horizontal position (see FIG. 3) in any point of the path. To effect, the tilting, cam 18 is lifted by means of device 19 until it gets in the way of lever 20.

The latter is at first pushed upwards without possibility of rotating, in that the polygonal part of pin 21 is still engaging hole 22, after which, once pin 21 is lifted at a point wherein it can rotate, the lever 20 engages tooth 27 along the cam. During its course upwards, pin 21 makes pinion 15 engage the toothed sector 14.

Besides, the upper part thereof pushes upwards pin 25, in contrast to the action of spring 24, in such a way as to release the plate from the clamping position.

At this stage, while the carriage continues its course, tooth 27 of cam 18 rotates lever 20, and this causes the rotation of pin 21 and pinion 15 which acts upon sector 14 bringing about the tilting of the plate, released by now. The plates may then be kept in a mainly horizontal position by means of a counterweight (FIG. 3A), or they may stay hanging (FIG. 2). Furthermore, it is possible (FIG. 4) to set a number of guides having a stretch in common the one next to the other, forming thus switches (29) to vary the path in accordance with what is required.

Obviously, the carriages and the feeding system have their own different features, and each of these elements can be worked separately. The above detailed description has illustrated an embodiment of the invention wherein the guide, acting as a support for the carriages, presents a slot in the upper part; it should be clear that it is possible as well to provide a supporting guide having a slot in the lower part, for hanging plates.

In the case illustrated in FIG. 1, there are provided two driving wheels on opposite sides, but clearly any similar system, e.g., a driving wheel with loose counterwheel, or a driving wheel and suitable thrust bearings on the opposite side, can work as well.

Besides, the spindle may be provided with a series of holes or the like, complementary with respect to working elements, such as for instance toothed driving wheels. Although there are provided independent spindles with semi-spherical heads, in some particular embodiments there may be provided hinged coupling means between one spindle and the other, particularly for transmitting dragging stresses. There can also be provided coupling devices which can be automatically controlled and/or released, e.g., in correspondence of some particular bendings and/or switches.

In the case of switches, all the bypass stretches should obviously be filled with spindles, and only the chosen stretch will be operational in respect of the switch. It is also evident that the above spindles have been described by mere way of example, and that they can be replaced by other similar means. In the illustrated examples, the main section of the guide is tubular, but it can be as well of any other shape, and the section of the dragged and dragging elements may vary accordingly.

One skilled in the art may then provide several changes and variations, which, however, must not depart from the ambit of the present invention.

I claim:

1. A sorting and conveying system comprising:
   (a) a plurality of tiltable carriages fixed on supports mounted on separate slidable spindles;
   (b) a substantially tubular guide provided with a continuous longitudinal slot through which said carriage supports extend; and
   (c) a plurality of openings spaced along said tubular guide through which driving means for the sliding movement of said spindles extend,
   said carriages consisting of tiltable plates which may rotate about said supports, each having a pin turning on the inside of said support, actioned by a cam inserted at a desired point along the path of travel, onto said pin there being keyed a level pinion which, when the pin is turned by the action of said cam, engages a gear on said plate, causing the tilting thereof.

2. A sorting and conveying system as claimed in claim 1 wherein the pin is placed in a housing made in the plate itself, pushed outwards by a spring until it fits into a corresponding hole in the supports and clamps the plate in a substantially horizontal position.

3. A sorting and conveying system as claimed in claim 1 comprising one or more rails following the path of the tubular guide, acting as support for the free end of the carriages, the distance between said carriages and the tubular guide varying according to the inclination of the path of travel, so that said plates are maintained in a substantially horizontal position during said travel.

4. A sorting and conveying system as claimed in claim 1 wherein the slidable spindles are substantially unconnected cylindrical bodies having semi-spherical ends.

* * * * *